United States Patent
Chen et al.

(10) Patent No.: US 9,900,843 B2
(45) Date of Patent: Feb. 20, 2018

(54) UPLINK POWER CONTROL TECHNIQUES FOR ULTRA LOW LATENCY IN LTE DEVICES

(71) Applicant: QUALCOMM Incorporated, San Diego, CA (US)

(72) Inventors: Wanshi Chen, San Diego, CA (US); Peter Gaal, San Diego, CA (US); Aleksandar Damnjanovic, Del Mar, CA (US); Hao Xu, San Diego, CA (US); Madhavan Srinivasan Vajapeyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/968,692

(22) Filed: Dec. 14, 2015

(65) Prior Publication Data
US 2016/0205631 A1  Jul. 14, 2016

Related U.S. Application Data

(60) Provisional application No. 62/102,458, filed on Jan. 12, 2015.

(51) Int. Cl.
*H04W 52/14* (2009.01)
*H04W 52/34* (2009.01)
(Continued)

(52) U.S. Cl.
CPC ......... *H04W 52/04* (2013.01); *H04W 52/146* (2013.01); *H04W 52/346* (2013.01); *H04W 52/367* (2013.01)

(58) Field of Classification Search
CPC ... H04W 52/04; H04W 52/146; H04W 52/16; H04W 52/346; H04W 72/0446; H04W 72/0473
See application file for complete search history.

(56) References Cited

U.S. PATENT DOCUMENTS

2003/0045288 A1\* 3/2003 Luschi ................. H04W 52/16
455/434
2008/0188260 A1\* 8/2008 Xiao .................. H04W 52/146
455/522
(Continued)

FOREIGN PATENT DOCUMENTS

WO    WO-2010/022773 A1    3/2010

OTHER PUBLICATIONS

International Search Report and Written Opinion—PCT/US2015/065832—ISA/EPO—Mar. 11, 2016. 11 Total Pages.

*Primary Examiner* — Wesley Kim
*Assistant Examiner* — Dong-Chang Shiue
(74) *Attorney, Agent, or Firm* — Arent Fox, LLP

(57) ABSTRACT

Uplink power control techniques for ultra low latency in Long Term Evolution (LTE) devices are presented. For example, an example method for transmission power control is described that includes determining that a first uplink transmission and a second uplink transmission are scheduled for transmission during a symbol of a subframe. In an aspect, the first uplink transmission has a first transmission time interval (TTI) and a first transmission power and the second uplink transmission has a second TTI, the second TTI being different from the first TTI, and a second transmission power. Furthermore, the method may include determining that a power limitation condition is met for one or both of the first transmission power or the second transmission power and adjusting one or both of the first transmission power or the second transmission power based on a determination that the power limitation condition is met.

30 Claims, 11 Drawing Sheets

(51) Int. Cl.
  *H04W 52/04*  (2009.01)
  *H04W 52/36*  (2009.01)

(56) References Cited

U.S. PATENT DOCUMENTS

| | | | | |
|---|---|---|---|---|
| 2009/0257408 A1* | 10/2009 | Zhang | .................. | H04L 1/1621 |
| | | | | 370/336 |
| 2010/0285830 A1* | 11/2010 | Englund | ............. | H04W 52/146 |
| | | | | 455/522 |
| 2012/0087306 A1* | 4/2012 | Kim | .................... | H04W 52/367 |
| | | | | 370/328 |
| 2013/0194938 A1* | 8/2013 | Immonen | ............... | H04B 1/525 |
| | | | | 370/252 |
| 2013/0242911 A1* | 9/2013 | Heo | ........................ | H04L 5/001 |
| | | | | 370/329 |
| 2014/0185495 A1* | 7/2014 | Kuchibhotla | ....... | H04W 76/023 |
| | | | | 370/281 |
| 2014/0269454 A1* | 9/2014 | Papasakellariou | .... | H04W 52/34 |
| | | | | 370/280 |
| 2016/0020891 A1* | 1/2016 | Jung | ................. | H04W 72/0446 |
| | | | | 370/280 |
| 2016/0302209 A1* | 10/2016 | Behravan | ................ | H04L 5/001 |
| 2017/0034812 A1* | 2/2017 | Deng | ................. | H04W 72/046 |

* cited by examiner

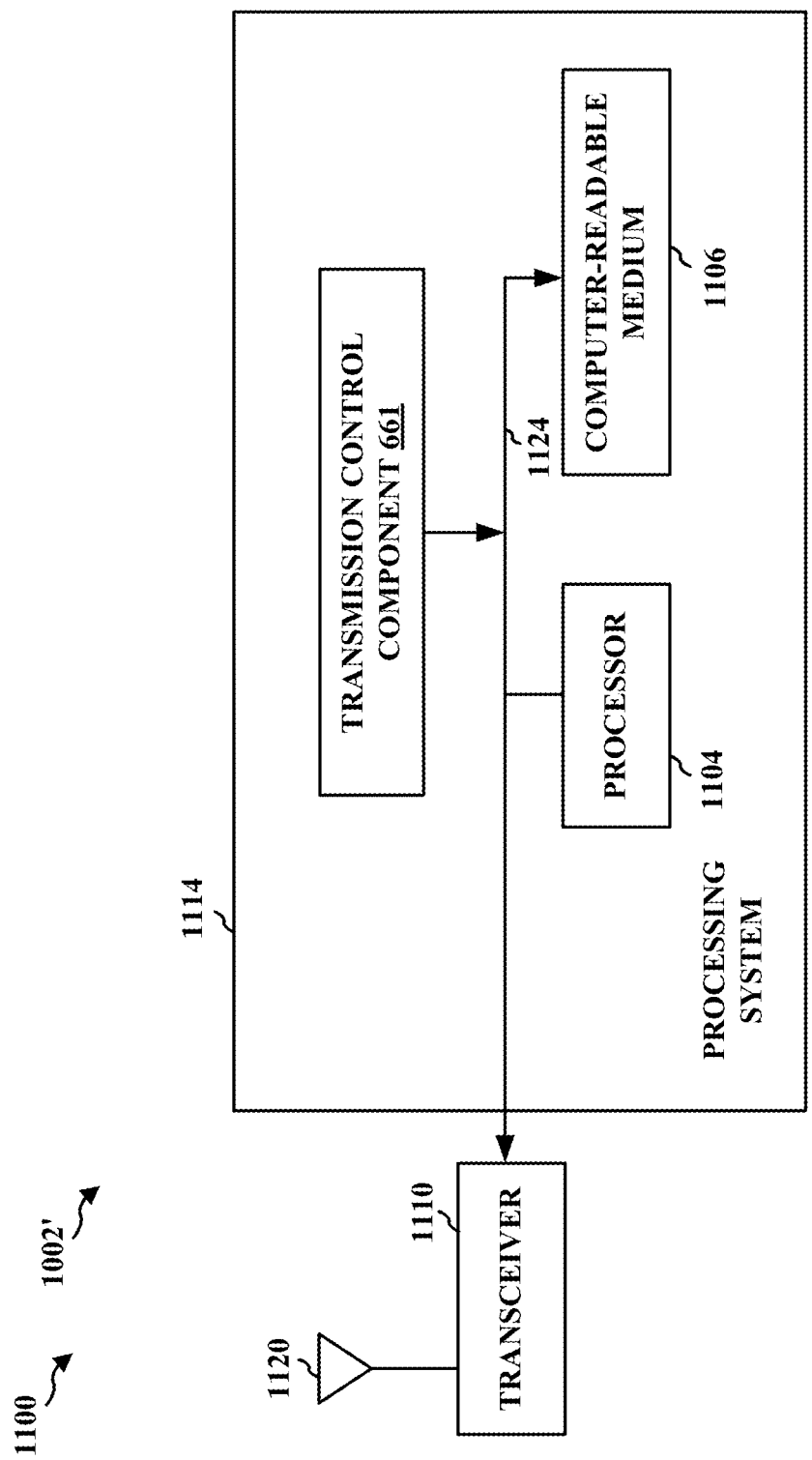

UPLINK POWER CONTROL TECHNIQUES FOR ULTRA LOW LATENCY IN LTE DEVICES

CROSS-REFERENCE TO RELATED APPLICATIONS

The present Application for Patent claims priority to Provisional Application No. 62/102,458 entitled "UPLINK POWER CONTROL FOR ULTRA LOW LATENCY IN LTE," filed Jan. 12, 2015, and assigned to the assignee hereof and hereby expressly incorporated by reference herein.

BACKGROUND

The present disclosure relates generally to communication systems, and more particularly, to uplink power control techniques for ultra low latency in Long Term Evolution (LTE) devices.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing legacy LTE, a plurality of UEs served by a particular eNodeB may be scheduled resources for communicating with the eNodeB over one or more channels using transmission time intervals (TTI) on the order of a 1 millisecond, which corresponds to the duration of a legacy LTE subframe. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes techniques for uplink power control for ultra low latency (ULL) in LTE communications. For instance, the disclosure presents an example method of transmission power control that includes determining that a first uplink transmission and a second uplink transmission are scheduled for transmission during a symbol of a subframe. According to the example method, the first uplink transmission may have a first TTI and a first transmission power and the second uplink transmission may have a second TTI, the second TTI being different from the first TTI, and a second transmission power. In addition, the example method may include determining that a power limitation condition is met for one or both of the first transmission power or the second transmission power. Furthermore, the example method may include adjusting one or both of the first transmission power or the second transmission power based on a determination that the power limitation condition is met.

Additionally, the present disclosure describes an apparatus for performing transmission power control, the example apparatus including means for determining that a first uplink transmission and a second uplink transmission are scheduled for transmission during a symbol of a subframe. In an aspect, the first uplink transmission may have a first TTI and a first transmission power and the second uplink transmission may have a second TTI, the second TTI being different from the first TTI, and a second transmission power. Furthermore, the example apparatus may include means for determining that a power limitation condition is met for one or both of the first transmission power or the second transmission power. Moreover, the example apparatus may include means for adjusting one or both of the first transmission power or the second transmission power based on a determination that the power limitation condition is met.

Further disclosed herein is a non-transitory computer-readable medium storing computer-executable code for transmission power control, the code including instructions executable to determine that a first uplink transmission and a second uplink transmission are scheduled for transmission during a symbol of a subframe. In an aspect of the example computer-readable medium, the first uplink transmission has a first TTI and a first transmission power and the second uplink transmission has a second TTI, the second TTI being different from the first TTI, and a second transmission power. In addition, the instructions may include instructions executable to determine that a power limitation condition is met for one or both of the first transmission power or the second transmission power, and instructions executable to adjust one or both of the first transmission power or the second transmission power based on a determination that the power limitation condition is met.

In an additional aspect, disclosed herein is an example apparatus for performing transmission power control, which includes a processor, memory in electronic communication with the processor, and instructions stored in the memory. In some examples, these instructions are executable by the processor to determine that a first uplink transmission and a second uplink transmission are scheduled for transmission during a symbol of a subframe, where the first uplink transmission has a first TTI and a first transmission power and the second uplink transmission has a second TTI, the second TTI being different from the first TTI, and a second transmission power. Additionally, the instructions further include instructions executable by the processor to determine that a power limitation condition is met for one or both of the first transmission power or the second transmission power. Furthermore, the instructions may include instructions executable by the processor to adjust one or both of the first transmission power or the second transmission power based on a determination that the power limitation condition is met.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

FIG. 11 is a diagram illustrating an example of a hardware implementation for an apparatus employing a processing system.

DETAILED DESCRIPTION

Figure 1:
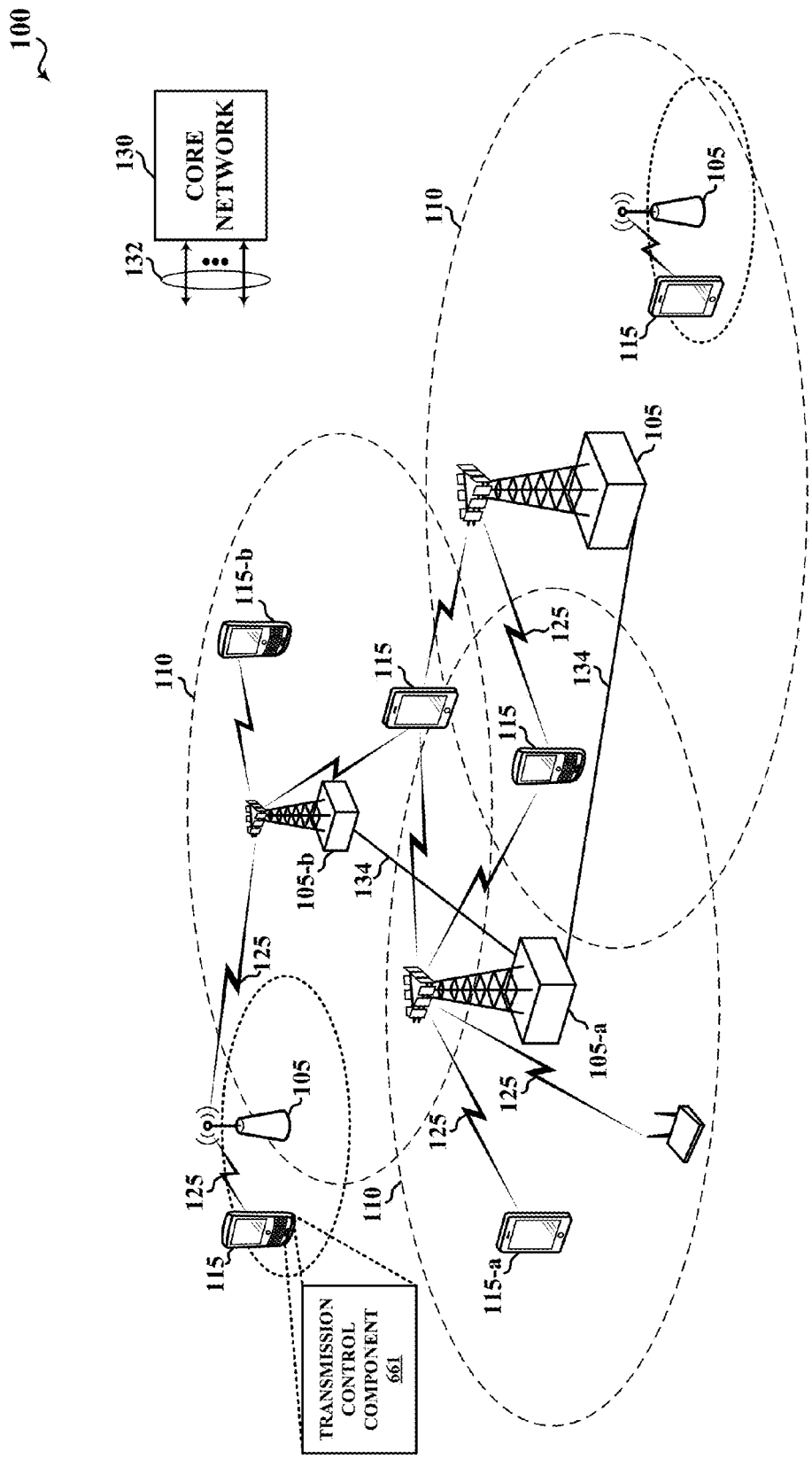
FIG. 1 shows a block diagram conceptually illustrating an example of a telecommunications system, in accordance with an aspect of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present disclosure presents example methods and apparatuses for managing transmission of wireless signals in a wireless communications environment implementing communication technologies each having a unique associated TTI for communication of data and control information. For instance, in some examples, such a communication technology may utilize a TTI on the order of 1 ms. For purposes of the present disclosure, such a communication technology may be referred to as a "legacy" communication technology (e.g., LTE, legacy LTE, legacy technique, legacy protocol). Additionally, the multiple communication technologies may include a communication technology that uses a TTI on the order of one symbol, or on the order of 70-90 microseconds.

For purposes of the present disclosure, such a communication technology may be referred to as an Ultra Low Latency, or ULL, communication technology (e.g., ULL LTE, ULL, ULL protocol). Furthermore, although some example techniques described in the present disclosure may implement ULL by utilizing a one-symbol TTI, this is not the exclusive TTI length associated with ULL communication. Instead, in some instances contemplated by the present disclosure, a two-symbol, three-symbol, or full slot ULL TTI length may be implemented.

In an aspect of the present disclosure, details related to generation and/or transmission of data or control information by a UE, such as the transmission power used for the transmission, may vary depending on whether a communication or channel that is to carry the transmission utilizes a legacy communication technology or a ULL communication technology. Such specifics may further depend on whether both ULL and legacy transmissions are scheduled for concurrent transmission (i.e., during scheduled time periods that at least partially overlap). For instance, where both ULL and legacy data is scheduled for transmission during a particular symbol of a subframe, the UE may alter a transmission power associated with the ULL and/or legacy transmission if it determined that the total transmission power required for the concurrent transmissions exceeds a transmission power limit associated with the UE. According to the present disclosure, where it is determined that the total transmission power exceeds this transmission power limit, a power limitation condition is said to exist. In other words, where scheduled ULL and legacy transmissions overlap, even partially, in time (or "collide"), the UE may compare the sum of the transmission powers associated with the ULL and legacy transmissions and may determine that a power limitation condition exists where this sum of the transmission powers exceeds a transmission power limit of the UE. In an aspect, where such a power limitation condition exists, the UE may alter the transmission power of one or both of the ULL transmission and the legacy transmission, at least during the period over which the transmissions overlap, such that the transmission power limit is not exceeded.

In some examples, the UE may alter the transmission power of the ULL and/or legacy transmissions by prioritizing the ULL transmission over the legacy transmission where the ULL and legacy transmissions collide. In other words, an available amount of transmission power corresponding to the transmission power limit may be allocated such that the ULL transmission is not altered so long as a remaining power (i.e., after the ULL transmission power is allocated) satisfies a guaranteed minimum power for the legacy transmission. In an aspect, the guaranteed minimum power for the legacy transmission may be hard-coded into the UE or configured by the network and may be based on one or more legacy channel parameters (e.g., Physical Uplink Shared Channel (PUSCH) parameters).

In alternative or additional examples, the UE may scale the ULL transmission power and the legacy transmission power to a ULL guaranteed minimum transmission power and a legacy minimum transmission power, respectively. In an aspect, the UE may scale these transmission powers such that the sum of the ULL guaranteed minimum transmission power and the legacy guaranteed minimum transmission power does not exceed the transmission power limit for the UE for the one or more symbols during which the transmissions collide. In an aspect, the ULL guaranteed minimum transmission power and a legacy guaranteed minimum transmission power may be periodically reconfigured as the transmission power limit may change over time.

In addition, for legacy transmissions, if transmission power scaling occurs on a per-symbol basis, traffic-to-pilot ratio (TPR) will no longer remain constant within a subframe. This variable TPR within a subframe for legacy LTE systems may cause additional communication complexity, such as increased decoding complexity at a network entity (e.g., an eNodeB). Though channels using Quadrature Phase-Shift Keying (QPSK) may not experience significant performance degradation due to variable TPR resulting from transmission power scaling, channels using other modulation orders may experience noticeable performance degradation when TPR varies inside of a subframe. As such, according to an aspect of the present disclosure, a limited number of potential TPR values may be utilized for hypotheses detection. For instance, a 0 dB TPR, a guaranteed TPR, and a $-\infty$ dB TPR (i.e., indicating that the transmission for the symbol is dropped) may be maintained. In an alternative aspect, the UE may be configured to signal a TPR to a network entity, for example, at the end of a subframe or in a next subframe. Moreover, in some instances, the TPR signaling by the UE may be performed on a per-slot basis rather than a per-subframe basis.

In addition, the present disclosure presents a method for parallel transmission of acknowledgement messages (ACK) and not-acknowledged messages (NACK) for both ULL and legacy transmissions, for example, in a single symbol of subframe. For instance, in an aspect of the present disclosure, a legacy control channel (e.g., Physical Uplink Control Channel (PUCCH)) may carry ACK/NACK messages for legacy control. The PUCCH may carry ACK/NACK feedback for component carriers (CCs) or under a same group in dual-carrier scenarios. Additionally, a separate uplink control channel, which may be referred to herein as an ULL PUCCH or "uPUCCH," may be utilized by the UE for transmitting ACK/NACK messages to a network entity (or vise versa). The uPUCCH may carry ACK/NACK feedback for ULL CCs in carrier aggregation scenarios and feedback under the same group in dual-carrier scenarios. In other words, ACK and NACK messages may be communicated between the UE and a network entity in parallel using both a PUCCH and a uPUCCH depending upon whether the communication utilizes legacy LTE or ULL LTE.

In a further aspect of the present disclosure, UEs configured for ULL operation also support legacy scheduling request (SR) operations. For example in an aspect, a UE may configure a legacy SR that may indicate a need for uplink ULL traffic. For instance, the UE may utilize a unique SR configuration, or may utilize a first set of SR subframes to indicate the need for legacy LTE traffic and a second set of SR subframes to indicate the need for ULL traffic. Alternatively or additionally, the UE may be configured to indicate the need for ULL traffic in a Buffer Status Report (BSR) that is sent to the network entity. Alternatively or additionally, the UE may utilize a single-symbol-based transmission to indicate a need for UL ULL to a network entity. For instance, if there is a need for UL ULL transmissions, the UE may initiate contention-based uPUSCH transmissions.

Additionally, in an aspect, a UE may communicate with a network entity over a dedicated ULL SR channel, which may be referred to as a "uSR" for purposes of the present disclosure. In the case of a dedicated uSR, a UE may be assigned a dedicated SR resource (e.g., a specific cyclic shift in the radio bearer), which may be periodically reassigned. In the case of a shared uSR, two or more UEs may be assigned a shared SR resource, and it may be left to the network entity (e.g., eNB) to differentiate among the UEs.

FIG. 1 shows an example wireless communications system 100, in accordance with an aspect of the present disclosure. The wireless communications system 100 includes a plurality of access points (e.g., base stations, eNBs, or WLAN access points) 105, a number of user equipment (UEs) 115, and a core network 130. In an aspect, the one or more of UEs 115 may include a transmission control component 661 configured to generate and transmit data and/or control information on an uplink channel to a network entity (e.g., an access point 105) according to legacy and/or ULL processes described in the present disclosure.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-a may communicate with access point 105-a on both a first hierarchical layer that supports first layer transmissions with a first subframe type and a second hierarchical layer that supports second layer transmissions with a second subframe type. For example, access point 105-a may transmit subframes of the second subframe type that are time division duplexed with subframes of the first subframe type.

In some examples, hybrid UE 115-a may acknowledge receipt of a transmission by providing ACK/NACK for the transmission through, for example, a HARQ scheme. Acknowledgments from hybrid UE 115-a for transmissions in the first hierarchical layer may be provided, in some examples, after a predefined number of subframes following the subframe in which the transmission was received. The hybrid UE 115-a, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit subframes of the second subframe type exclusively, or may transmit one or more subframes of the first subframe type on the first hierarchical layer that are time division multiplexed with subframes of the second subframe type. Second layer UE 115-b, in the event that access point 105-b transmits subframes of the first subframe type, may ignore such subframes of the first subframe type. Thus, second layer UE 115-b may acknowledge receipt of transmissions in a same subframe as the subframe in which the transmissions are received. Thus, second layer UE 115-b may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul link 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
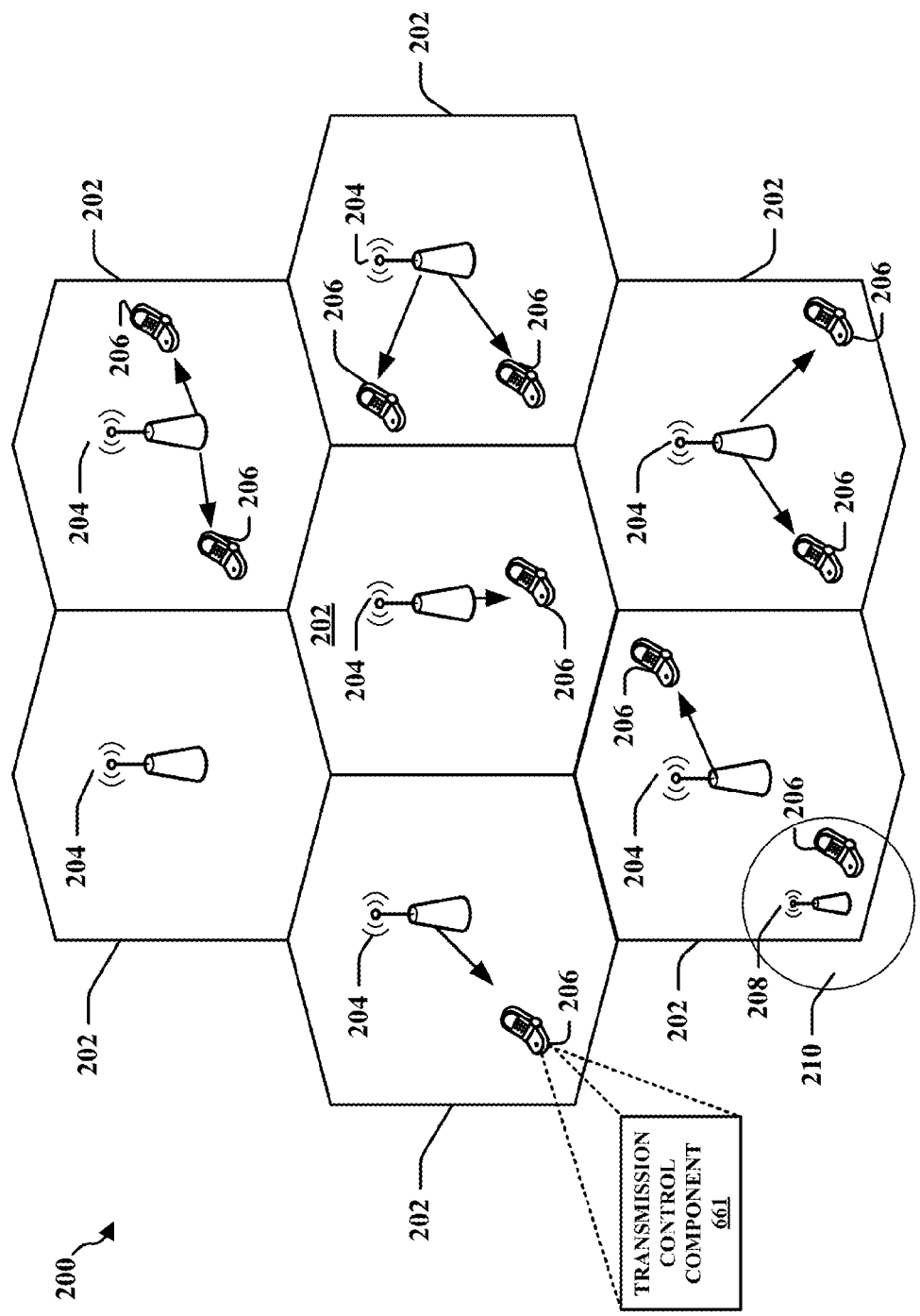
FIG. 2 is a diagram illustrating an example of an access network.

FIG. 2 is a diagram illustrating an example of an access network 200 in an LTE (and/or ULL LTE) network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the Evolved Packet Core for all the UEs 206 in the cells 202. In an aspect, macro eNBs 204 or lower power class eNBs 208 may constitute an access point or network entity in the present disclosure, such as, but not limited to access point 105 of FIG. 1, Similarly, one or more of UEs 206 may include a transmission control component 661 configured to generate and transmit data and/or control information to a network entity (e.g., access points 105 of FIG. 1 or eNBs 208 of FIG. 2) according to legacy and/or ULL processes described in the present disclosure. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications as well as ULL LTE applications as defined herein. However, these concepts may be readily extended to other telecommunication standards employing other modulation and multiple access techniques. By way of example, these concepts may be extended to Evolution-Data Optimized (EV-DO) or Ultra Mobile Broadband (UMB).

EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
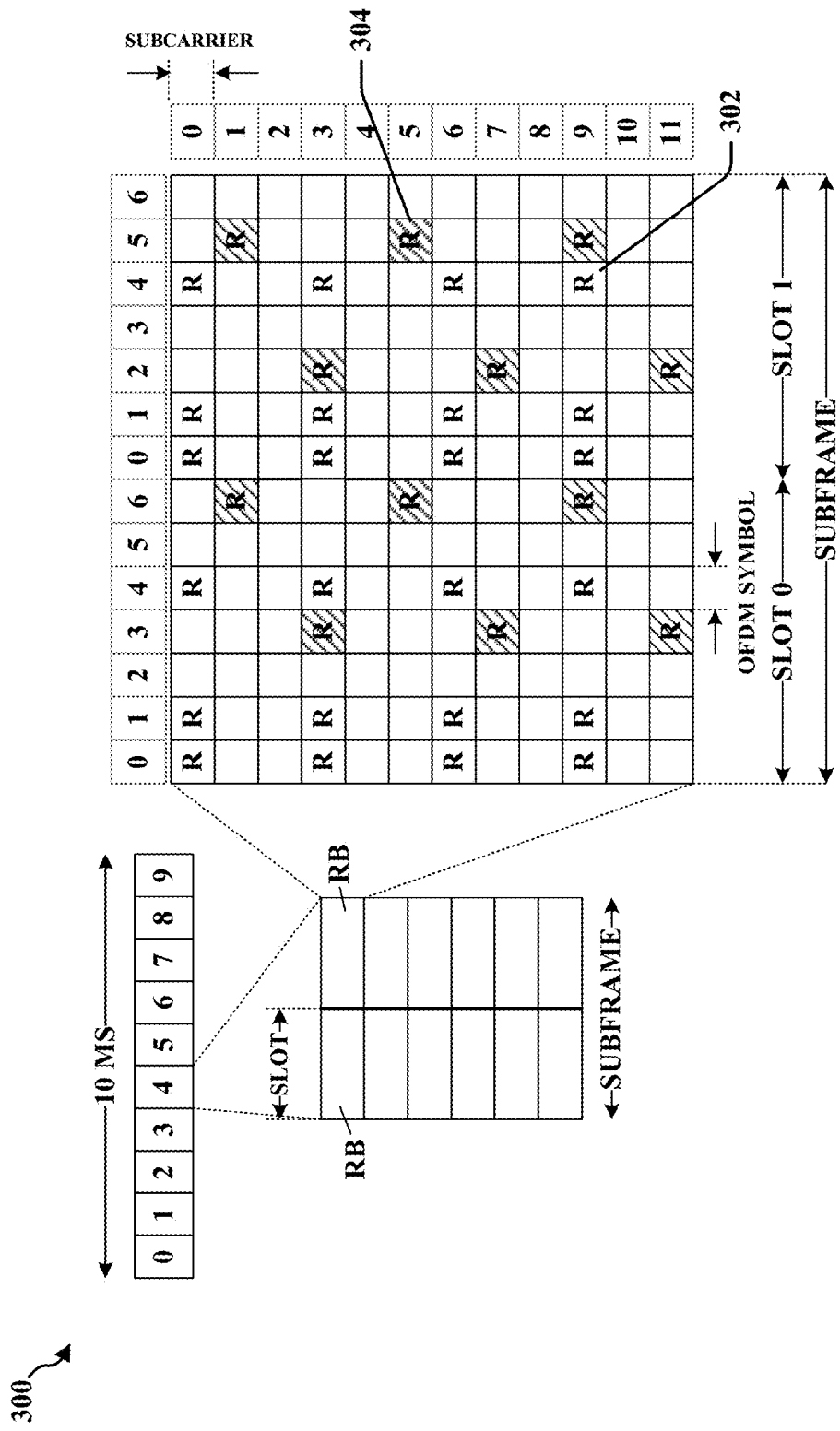
FIG. 3 is a diagram illustrating an example of a DL frame structure in legacy LTE.

FIG. 3 is a diagram 300 illustrating an example of a DL frame structure in legacy LTE, which, in some examples, may be utilized in conjunction with a downlink frame structure for ULL LTE aspects provided by the present disclosure. A frame (10 ms) may be divided into 10 equally sized sub-frames (one ms each). Each subframe may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, seven consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
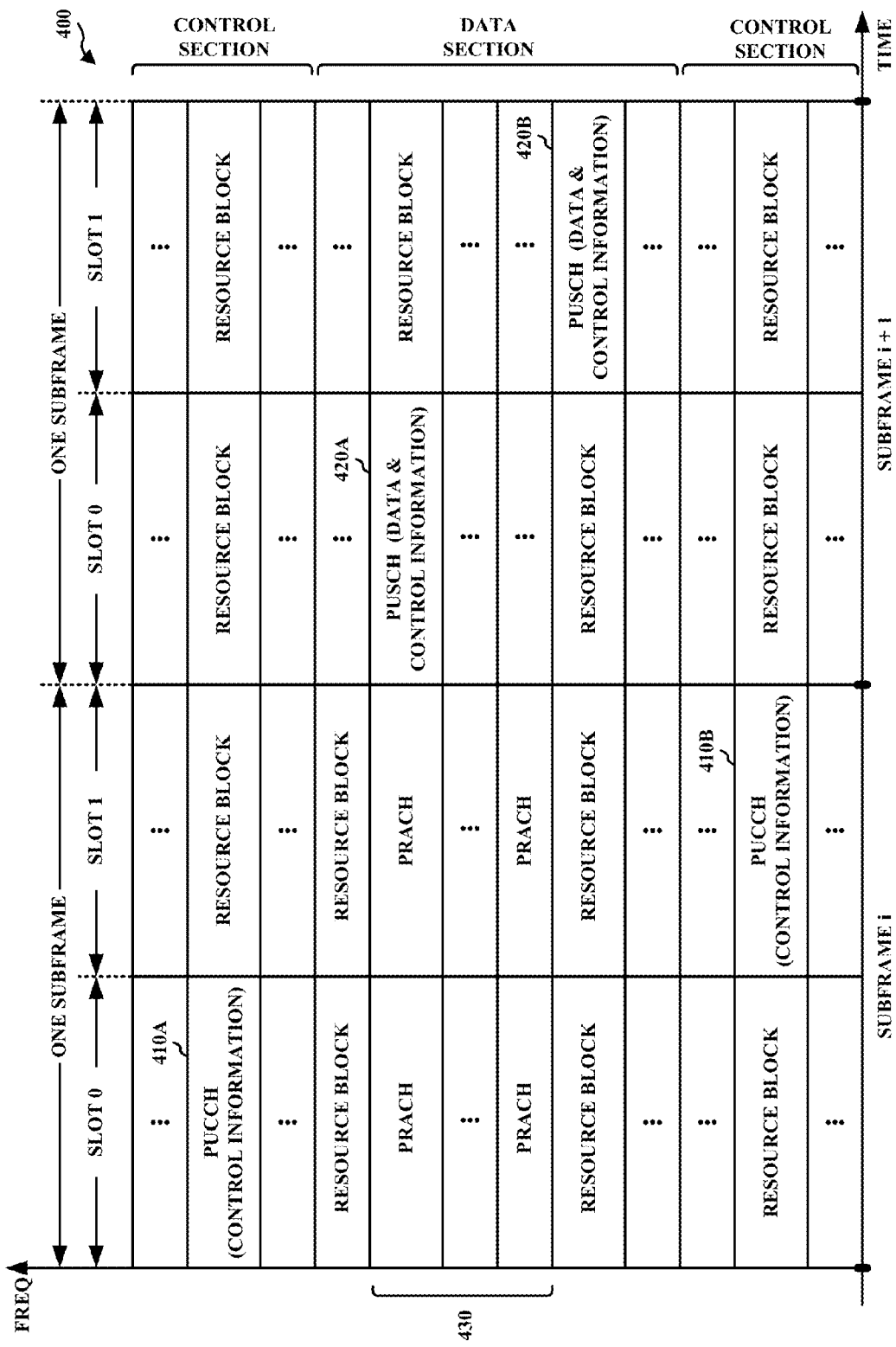
FIG. 4 is a diagram illustrating an example of an UL frame structure in legacy LTE.
Figure 6:
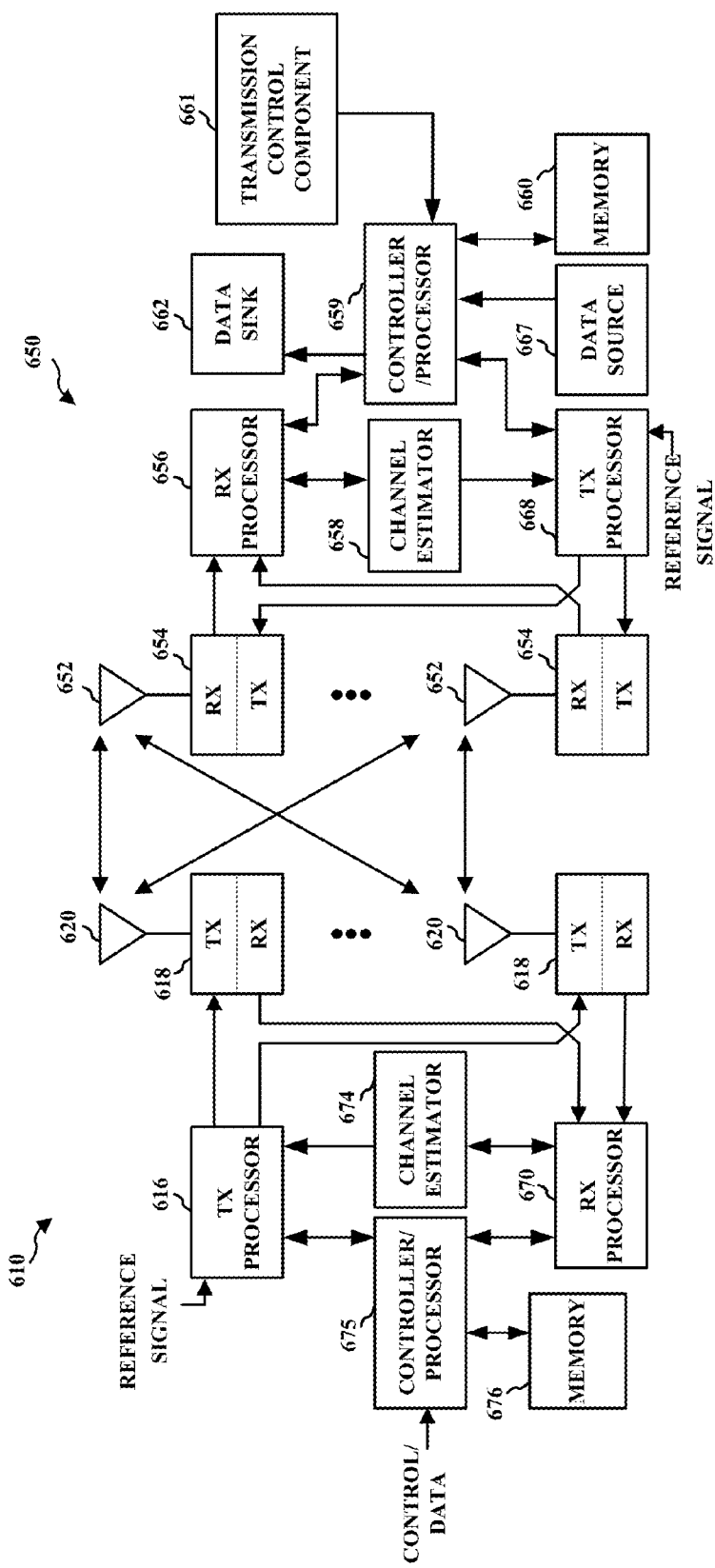
FIG. 6 is a diagram illustrating an example of an evolved Node B and user equipment in an access network.
Figure 10:
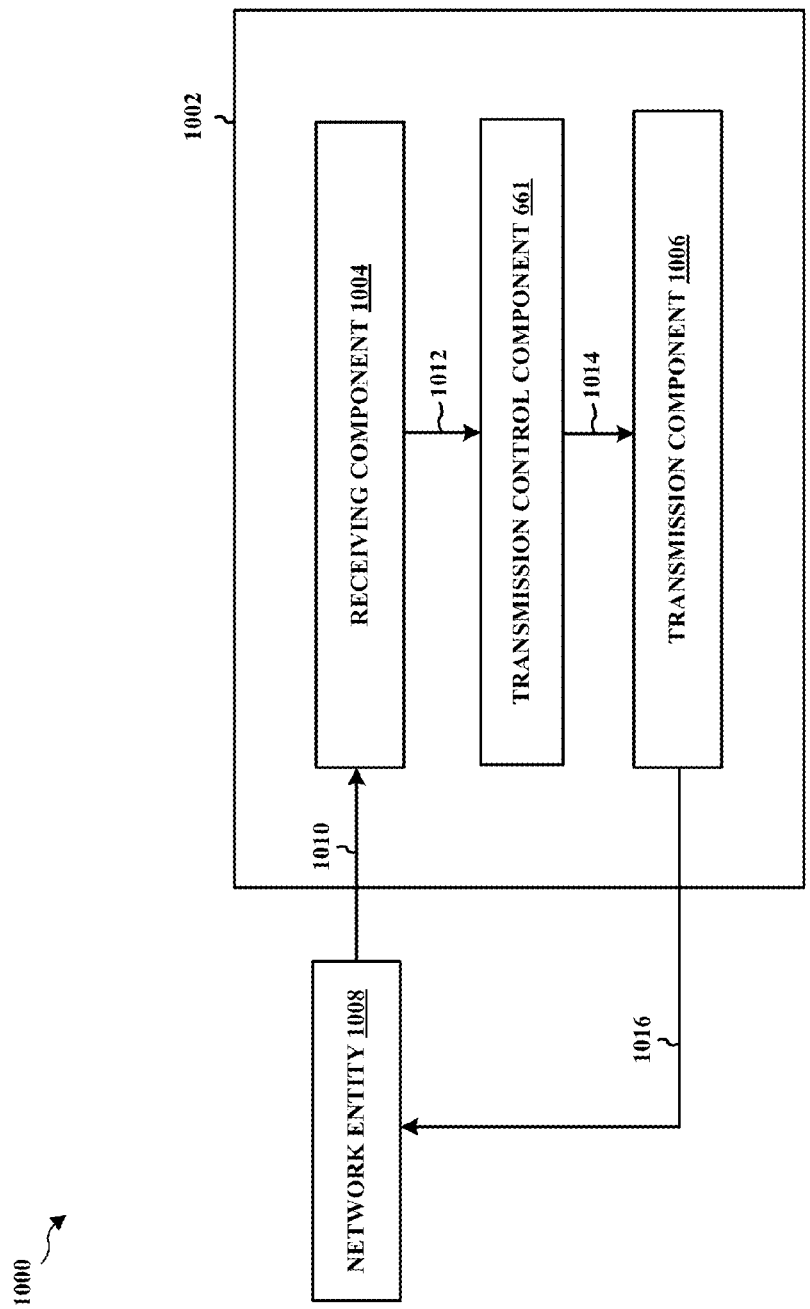
FIG. 10 is a conceptual data flow diagram illustrating the data flow between different modules/means/components in an exemplary apparatus.

FIG. 4 is a diagram 400 illustrating an example of an UL frame structure in legacy LTE, which may be implemented for one or more legacy LTE uplink transmissions by a UE, such as, but not limited to, UE 115 of FIG. 1, UE 206 of FIG. 2, UE 650 of FIG. 6, a UE implementation of apparatus 1002 of FIG. 10, and/or a UE implementation of apparatus 1002' of FIG. 11, according to an aspect of the present disclosure. For instance, as will be explained in further detail below, first uplink transmission 708 may be a legacy uplink transmission and may therefore follow the UL frame structure described in diagram 400. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single legacy LTE subframe (1 ms) or in a sequence of few contiguous legacy LTE subframes and a UE can make only a single PRACH attempt per frame (10 ms).

Figure 5:
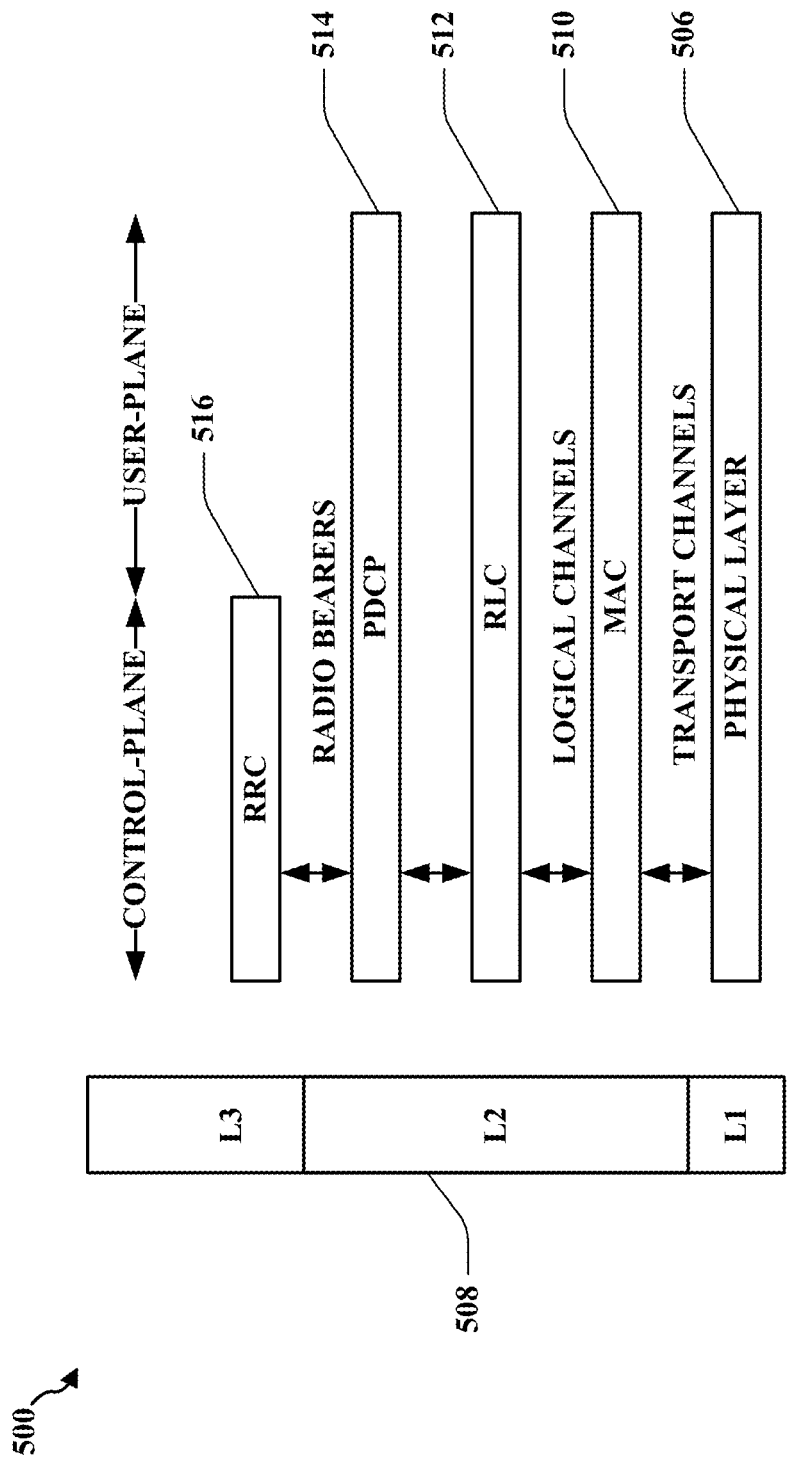
FIG. 5 is a diagram illustrating an example of a radio protocol architecture for the user and control planes.

FIG. 5 is a diagram 500 illustrating an example of a radio protocol architecture for the user and control planes in legacy LTE, which may also be used as a radio protocol architecture for ULL LTE techniques described in the present disclosure. Specifically, the radio protocol architecture shown in FIG. 5 may be utilized for communication between any UE and an eNB (or network entity or access point) disclosed herein. For instance, such UEs may include UE, such as, but not limited to, UE 115 of FIG. 1, UE 206 of FIG. 2, UE 650 of FIG. 6, a UE implementation of apparatus 1002 of FIG. 10, and/or a UE implementation of apparatus 1002' of FIG. 11, or any UE containing transmission control component 661 (see FIG. 6). In addition, such an eNB (or network entity or access point) may correspond to access point 105 of FIG. 1, lower power class eNB 208 or eNB 204 of FIG. 2, eNB 610 of FIG. 6, or network entity 1008 of FIG. 10.

The radio protocol architecture of FIG. 5 is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

FIG. 6 is a block diagram of an eNB 610 in communication with a UE 650 in an access network. In an aspect, eNB 610 and UE 650 may be configured to perform one or more aspects related to LTE and ULL LTE communication and transmission power control disclosed in the present disclosure. In an aspect, UE 650 may be UE 115 of FIG. 1, UE 206 of FIG. 2, UE 650 of FIG. 6, a UE implementation of apparatus 1002 of FIG. 10, and/or a UE implementation of apparatus 1002' of FIG. 11, or any UE containing transmission control component 661 (see FIG. 6). In addition, eNB 610 may constitute a network entity or access point according to the present disclosure, and therefore may correspond to access point 105 of FIG. 1, lower power class eNB 208 or eNB 204 of FIG. 2, eNB 610 of FIG. 6, or network entity 1008 of FIG. 10.

In the DL in FIG. 6, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. In addition, UE 650 may include a transmission control component 661 configured to generate and transmit data and/or control information to a network entity (e.g., access points 105) according to legacy and/or ULL processes described in the present disclosure.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

Figure 7:
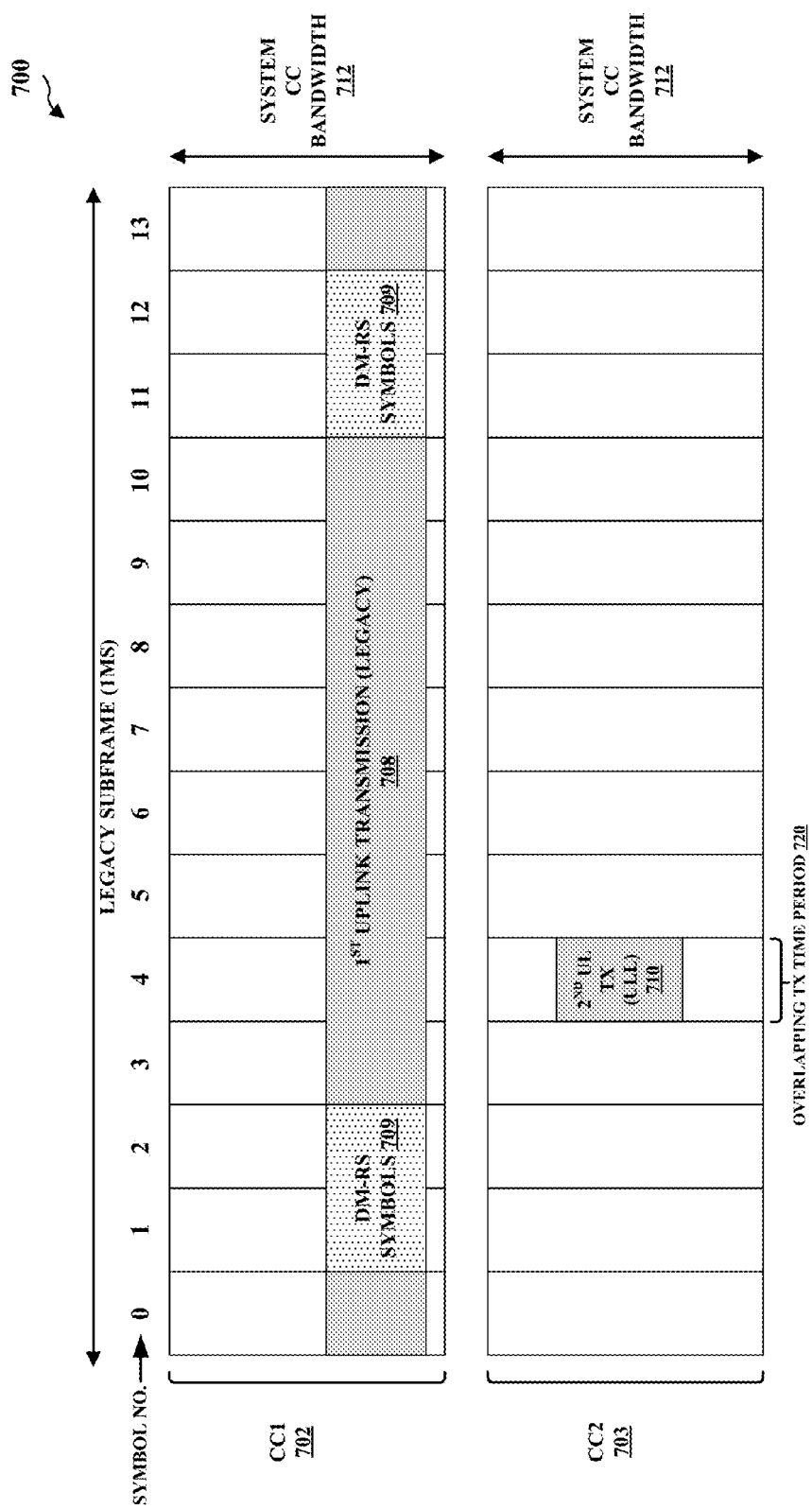
FIG. 7 is a diagram illustrating an example subframe with colliding uplink transmission grants according to the present disclosure.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. In addition, controller/processor may be in communication with a FIG. 7 is a diagram illustrating an example LTE subframe 700 that includes a plurality of scheduled uplink transmissions, which include a first uplink transmission 708 and a second uplink transmission 710. In an aspect, a first component carrier (CC1) 702 may be scheduled to carry one or more legacy LTE uplink transmissions, and a second component carrier (CC2) 703 may be scheduled to carry one or more ULL uplink transmissions. As shown in example subframe 700, the first uplink transmission 708 and the second uplink transmission 710 may be scheduled to be transmitted by a UE during an overlapping transmission time period 720. In other words, the uplink transmissions may "collide." For instance, in subframe 700 of FIG. 7, first uplink transmission 708 and second uplink transmission 710 may both be scheduled for transmission during a fifth symbol (symbol number 4) of subframe 700, indicated by overlapping transmission time period 720. In addition, in an aspect, as shown in FIG. 7, the first uplink transmission 708 (using legacy LTE) may include one or more demodulation reference signal (DM-RS) symbols 709, which may utilized by one or more network-side devices for channel estimation and/or coherent demodulation where the legacy LTE first uplink transmission 708 is a PUSCH or PUCCH transmission. Though not shown in FIG. 7, in some examples, the overlapping transmission time period 720 may coincide with such a DM-RS symbol 709 in the first uplink transmission 708.

Furthermore, although FIG. 7 illustrates a scenario where a legacy LTE uplink transmission (first uplink transmission 708) collides with an ULL uplink transmission (second uplink transmission 710) during an overlapping transmission time period 720 having a single-symbol duration (symbol number 4), this scenario is by no means limiting. For example, transmission power control techniques described in the present disclosure may be implemented regardless of the transmission type (i.e., legacy LTE or ULL LTE) associated with either colliding transmission. For instance, the techniques described herein may be implemented where the two or more colliding transmissions are all of the same transmission type (e.g., all ULL LTE or all legacy LTE) as well as where the two of more colliding transmissions include at least one transmission of each transmission type (the scenario illustrated in FIG. 7). Furthermore, although two component carriers (CC1 702 and CC2 703) are shown in FIG. 7, this example is non-limiting. For instance, depending on its capabilities, a particular UE may be scheduled to simultaneously perform three or more transmissions on three or more component carriers and execute transmission power control for each of these transmissions.

Returning to the implementation scenario illustrated in subframe 700 of FIG. 7, first uplink transmission 708 and second uplink transmission 710 may each have an associated transmission power—namely, a first transmission power and a second transmission power, respectively. These respective transmission powers represent a transmission power level at which the respective uplink transmissions are scheduled to be transmitted. In an aspect of the present disclosure, however, one or both of the first transmission power or second transmission power may be altered when the first uplink transmission 708 and the second uplink transmission 710 collide during an overlapping transmission time period 720. For instance, in an aspect, a UE may be configured to determine whether the sum of the first transmission power and the second transmission power exceeds a total transmission power available of the UE for the symbol. Where the sum exceeds the total transmission power, the UE may determine that a power limitation condition exists for the subframe, and as a result, the UE may adjust one or both of the first transmission power or the second transmission power.

In other examples, one or both of the first transmission power or the second transmission power may be scaled to corresponding guaranteed minimum transmission powers. For instance, where the first uplink transmission 708 is a legacy transmission and the second uplink transmission 710 is a ULL transmission, the first transmission power may be adjusted to a legacy guaranteed transmission power and the second transmission power may be adjusted to a ULL guaranteed transmission power. In an aspect, the sum of the legacy guaranteed transmission power and the ULL guaranteed transmission power may be configured to be less than or equal to the total available transmission power for the symbol such that both the legacy uplink transmission and ULL uplink transmissions can be transmitted to the network entity. Furthermore, in some examples, the UE may give priority to any available transmission power to certain transmissions relative to other transmissions. For instance, in one example implementation, priority may be given to first uplink transmission 708 so long as a minimum uplink transmission power for the second uplink transmission 710 is available after the first transmission power is subtracted from the available transmission power for the UE for the symbol. These and other aspects of the transmission power control techniques of the present disclosure are described further in reference to FIG. 8, below.

Figure 8:
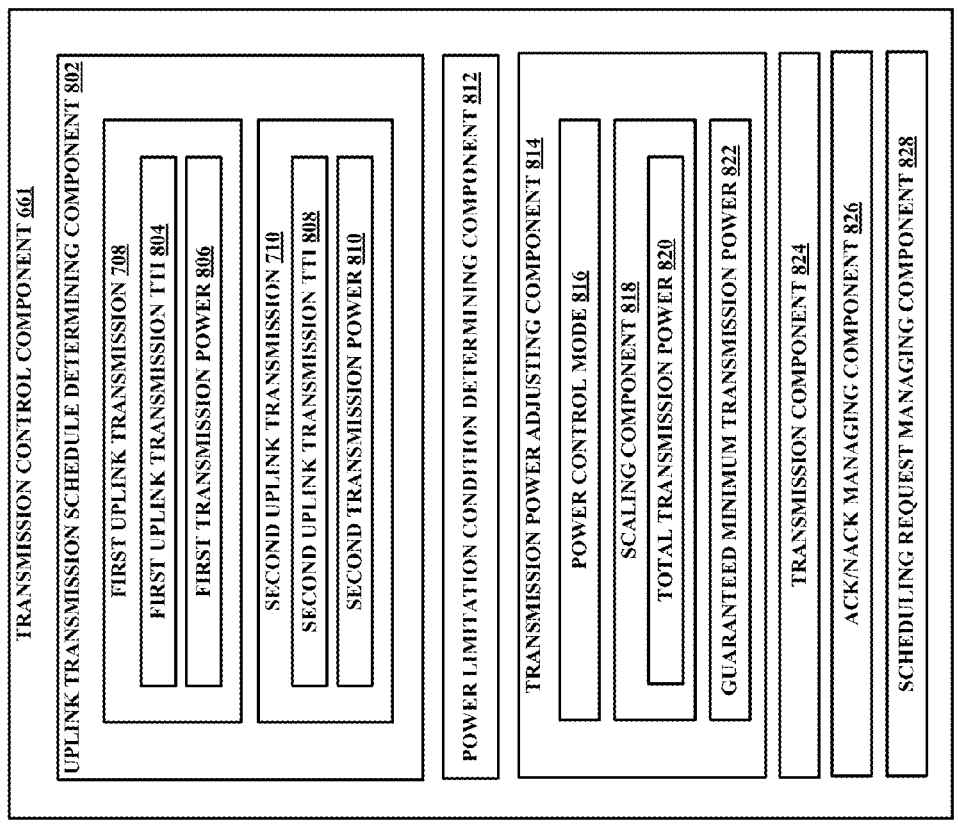
FIG. 8 is a diagram illustrating a transmission control component configured to implement aspects of the present disclosure.

FIG. 8 is a block diagram containing a plurality of sub-components of a transmission control component 661, which may be implemented by a UE for generating and transmitting data and/or control information to one or more network entities. For example, such a UE implementing the transmission control component 661 may include any of UE 115 of FIG. 1, UE 206 of FIG. 2, UE 650 of FIG. 6, a UE implementation of apparatus 1002 of FIG. 10, and/or a UE implementation of apparatus 1002' of FIG. 11, or any UE containing transmission control component 661. In an aspect of the present disclosure, transmission control component 661 may include an uplink transmission schedule determining component 802, which may be configured to determine or otherwise obtain an uplink transmission schedule that may include resource information (e.g., identifying one or more resource elements, resource element blocks, frequencies, tones, component carriers, subcarriers, or any other transmission medium or resource) and timing information (e.g., one or more symbols, slots, subframes, frames, etc.) or any other information indicating when and over which frequencies one or more signals are to be transmitted by one or more UEs to a network entity during a time period indicated in the timing information.

Furthermore, first uplink transmission 708 and second uplink transmission 710 may each have an associated transmission power—namely, a first transmission power 806 and a second transmission power 810, respectively. These respective transmission powers represent a power level at which the respective uplink transmissions are scheduled to be transmitted. In an aspect, the first transmission power 806 and second transmission power 810 may be obtained from another device other than the UE, such as a network entity charged with scheduling uplink transmissions for the UE and also charged with setting the transmission powers associated with the scheduled transmissions. In such cases, the first transmission power 806 and second transmission power 810 may be updated for every scheduled transmission, or for every slot, frame, subframe, or any other time unit, and may be included in a scheduling message received from a scheduling network entity.

In an aspect, e.g., from a network entity such as an eNB that a first uplink transmission 708 and a second uplink transmission 710 are concurrently scheduled for transmission during a symbol of a subframe (see FIG. 7) that constitutes an overlapping transmission time period. In other words, the uplink transmission schedule determining component 802 may be configured to determine that first uplink transmission 708 and second uplink transmission 710 collide in the symbol. In addition, in some examples, the first uplink transmission 708 may have an associated first uplink transmission TTI 804 and a first transmission power 806. Likewise, the second uplink transmission 710 may have an associated second uplink transmission TTI 808 different from the first uplink transmission TTI 804, and a second transmission power 810. In some examples, each of first uplink transmission TTI 804 and second uplink transmission TTI 808 may be dependent upon whether the associated transmission is a legacy LTE transmission or an ULL LTE transmission. For instance, where a transmission is scheduled as a legacy LTE transmission, the associated TTI (i.e., first uplink transmission TTI 804 and/or second uplink transmission TTI 808) may be on the order of a subframe, or about one millisecond. Alternatively, where a transmission is scheduled as an ULL LTE transmission, the associated TTI (i.e., first uplink transmission TTI 804 and/or second uplink transmission TTI 808) may be on the order of one symbol of a legacy LTE subframe, or about 70 to 90 milliseconds.

Furthermore, transmission control component 661 may include a power limitation condition determining component 812, which may be configured to determine whether a power limitation condition is met for one or both of the first transmission power 806 or the second transmission power 810. For instance, in an aspect, power limitation condition determining component 812 may be configured to determine that a power limitation condition exists based on a comparison of the first transmission power 806 and a first maximum power (or a first guaranteed power). Alternatively or additionally, power limitation condition determining component 812 may be configured to determine that the power limitation condition exists based on a comparison of the second transmission power 810 and a second maximum power (or a second guaranteed power). In an aspect, uplink transmission schedule determining component 802 may be further configured to receive (e.g., from a network entity) or otherwise obtain a configuration of a first maximum (or guaranteed) power for the first uplink transmission 708 (and/or any transmission having first uplink transmission TTI 804, generally) and a second maximum (or guaranteed) power for the second uplink transmission TTI 808 (and/or any transmission having second uplink transmission TTI 808, generally). In some examples, power limitation condition determining component 812 may be configured to determine that the power limitation condition exists based on whether a sum of first transmission power 806 and the second transmission power 810 exceeds a total available power for a particular subframe during which transmissions collide.

In an additional aspect, transmission control component 661 may include a transmission power adjusting component, which may be configured to adjust the first transmission power 806, the second transmission power 810, or a combination thereof, based on a determination that the power limitation condition is met. For instance, transmission power adjusting component 814 may be configured to adjust first transmission power 806 based on the first maximum (or guaranteed) power when the power limitation condition is met. Furthermore, transmission power adjusting component 814 may be configured to adjust the second transmission power based on the second maximum (or guaranteed) power when the power limitation condition is met.

In an additional aspect, transmission power adjusting component 814 may be configured to receive (e.g., from a network entity) or otherwise obtain a configuration indicating a power control mode 816 for first uplink transmission 708 and/or second uplink transmission 710 and may perform transmission power adjustment further based on the received power control mode 816. For instance, the power control mode 816 may include a first power control mode where the second uplink transmission 710 (or any other transmission having second uplink transmission TTI 808) may be prioritized over the first uplink transmission 708 (or any other transmission having first uplink transmission TTI 804) when allocating available uplink transmission power for a particular symbol of a subframe. In addition, according to the first power control mode, although the second uplink transmission may be given higher priority, the first uplink transmission 708 may be allocated a guaranteed minimum transmission power 822.

In an alternative aspect, power control mode 816 may include a second power control mode where the first transmission power 806 and the second transmission power 810 are scaled based on a first guaranteed minimum transmission power and a second guaranteed minimum transmission power, respectively. As such, transmission power adjusting component 814 may include a scaling component 818, which may be configured to scale one or both of the first transmission power 806 or the second transmission power 810 such that a sum of the scaled transmission powers does not exceed a total transmission power 820 of the symbol. When the sum of the first guaranteed power and the second guaranteed power is equal to a UE-specific maximum power, power scaling can be such that for each TTI, if there is a power limitation condition, the transmission power is scaled to the corresponding guaranteed minimum power. When the sum of the first guaranteed power and the second guaranteed power is less than a UE-specific maximum power, the leftover power can be either un-used, or dynamically allocated to a TTI of a higher priority.

Furthermore, transmission power adjusting component 814 may be configured to adjust one or both of first transmission power 806 and second transmission power 810 based on one or more parameters associated with the transmission of the first TTI and/or the second TTI. As an example, power control mode can be further based on a modulation scheme associated with the first uplink transmission 708. If the modulation order is QPSK, a first power control mode may be used. If the modulation order is 16QAM, 64QAM, 256QAM, etc., a second power control mode may be used. This is due to the fact that QPSK based uplink transmissions are less sensitive to uplink power scaling and various traffic-to-pilot ratios comparing with other higher order modulation schemes. As another example, power control mode can be based on a rank associated with the first uplink transmission 708. If the rank is one, a first power control mode may be used. If the rank is more than one, a second power control mode is used. As yet another example, uplink power control can be based whether a symbol associated with the first uplink transmission 708 is a demodulation reference signal (DM-RS) symbol or not. If the symbol is a DM-RS symbol, the first TTI may be given a higher priority for power prioritization. If the symbol is not a DM-RS symbol, the first TTI may be given a lower priority for power prioritization.

In an aspect, transmission power adjusting component 814 may be configured to adjust one or both of first transmission power 806 and second transmission power 810 based on a channel type associated with the transmission of the first TTI and/or the second TTI. As an example, for PUSCH transmissions, power control mode can be based on either the first or the second power control mode. For PUCCH or PRACH transmissions, power control mode can be restricted to the second power control mode only.

In an aspect, a guaranteed minimum power or a maximum power for a TTI can be hardcoded or configured, for example, in a relative or absolute scale. As an example, in the relative scale, the guaranteed minimum power (or the maximum power) for the TTI can be specified as a percentage of a UE-specific maximum power, e.g., 50%. As another example, in the absolute scale, the guaranteed minimum power (or the maximum power) for the TTI can be specified in dBm, e.g., 18 dBm.

In an aspect, a guaranteed minimum power or a maximum power for a TTI can depend on a channel type. As an example, a first guaranteed minimum power can be specified for PUSCH transmissions, while a second guaranteed transmission minimum power can be specified for PUCCH transmissions. Additionally or alternatively, the specification of a guaranteed minimum power or a maximum power for a TTI can depend on an uplink control information type. For example, for PUCCH transmissions with only periodic channel state information, a first guaranteed minimum power can be specified, whereas for PUCCH transmissions with ACK/NAK or SR, a second guaranteed transmission minimum power can be specified.

In a further aspect, a guaranteed minimum power or a maximum power for a TTI can depend on a parameter associated with a transmission for the TTI. As an example, a first guaranteed minimum power can be specified for rank one PUSCH transmissions, while a second guaranteed transmission minimum power can be specified for PUSCH transmissions with more than one. For example, a first guaranteed minimum power can be specified for QPSK-based PUSCH transmissions, while a second guaranteed transmission minimum power can be specified for PUSCH transmissions with higher-order modulations (e.g., 16QAM and above).

In an aspect, if there is a power scaling on a per symbol basis to a legacy uplink transmission (e.g., PUSCH), traffic to pilot ratio (TPR) may no longer be a constant within a subframe. The DM-RS in two slots for PUSCH may have different power levels as well. The variable TPR levels across symbols within a subframe for the legacy uplink transmission will cause additional complexity in eNB decoding, compared with the case when a constant TPR is assumed across symbols within the subframe. While QPSK based on PUSCH transmissions, performance degradation may not be significant, PUSCH performance degradation can be significant for higher modulation orders (e.g., 16QAM and above). It is desirable to keep a limited set of TPR values across symbols for the legacy uplink transmission, such that eNB only needs to perform a limited hypotheses detection. As an example, the limited set of TPR values may include 0 dB TPR, a guaranteed TPR, and a -infinity dB TPR (i.e., zero power for symbol, or the symbol is dropped).

In an aspect, a UE may also signal TPR values of a set of symbols in a subframe for a legacy uplink transmission. The signaling can be done by the end of the subframe or in a subsequent subframe. The signaling of the TPR values can be done on a per slot or per subframe basis. As an example, for a legacy PUSCH transmission in a subframe made up of fourteen symbols, seven symbols per slot and with one DM-RS symbol in each slot, a 6-bit bitmap may be used to indicate the TPR values for each slot. A UE may further indicate a difference of DM-RS power in the two slots if the two DM-RS symbols have different power. Alternatively, if DM-RS symbols in the two slots have the same power, a 12-bit bitmap can be used to indicate the TPR values for the twelve data symbols in the subframe.

In a further aspect, transmission control component 661 may include transmission component 824, which may be configured to transmit the first uplink transmission 708 and the second uplink transmission 710 during the symbol after adjusting the first transmission power, the second transmission power, or any combination thereof. In an aspect, transmission component 824 may include a transmitter, transceiver, related circuitry, and/or any other component configured to transmit wireless communication signals.

Moreover, transmission control component 661 may include an ACK/NACK managing component 826, which may be configured to manage ACK/NACK feedback for a UE for legacy and ULL transmissions. For instance, in an aspect of the present disclosure, ACK/NACK managing component 826 may be configured to generate and transmit ACK/NACK feedback for a legacy control channel (e.g., a PUSCH), which may carry ACK/NACK messages for legacy control transmitted by transmission component 824. The PUCCH may carry ACK/NACK feedback for component carriers or under a same group in dual-carrier scenarios. Additionally, the ACK/NACK managing component 826 may be configured to generate and transmit ACK/NACK feedback for ULL communications via a separate uplink control channel (e.g., a uPUCCH), which may be utilized by the UE for transmitting ACK/NACK messages to a network entity (or vise versa) using transmission component 824. The uPUCCH may carry ACK/NACK feedback for ULL CCs in carrier aggregation scenarios and feedback under the same group in dual-carrier scenarios. In other words, ACK/NACK managing component 826 may be configured to generate and communicate ACK and NACK messages between the UE and a network entity in parallel using both a PUCCH and a uPUCCH depending upon whether the communication utilizes legacy LTE or ULL LTE.

In an additional aspect of the present disclosure, UEs configured for ULL operation can also support legacy SR operations using scheduling request managing component 828. For example, scheduling request managing component 828 may configure a legacy SR that may indicate a need for uplink ULL traffic to a network entity. For instance, the scheduling request managing component 828 may utilize a unique SR configuration, or may utilize a first set of SR subframes the need for legacy LTE traffic and a second set of SR subframes to indicate the need for ULL traffic. Alternatively or additionally, scheduling request managing component 828 may be configured to indicate the need for ULL traffic in a Buffer Status Report (BSR) that is sent to the network entity. Alternatively or additionally, scheduling request managing component 828 may utilize a single-symbol-based transmission to indicate a need for UL ULL to a network entity. For instance, if there is a need for UL ULL transmissions, scheduling request managing component 828 may initiate contention-based uPUSCH transmissions. Additionally, the UE and the network entity can communicate over a dedicated ULL SR channel, (e.g., a uSR). In the case of a dedicated uSR, a UE may be assigned a dedicated SR resource (e.g., a specific cyclic shift in the radio bearer), which may be periodically reassigned. In the case of a shared uSR, two or more UEs may be assigned a shared SR resource, and it may be left to the network entity (e.g., eNB) to differentiate among the UEs.

Figure 9:
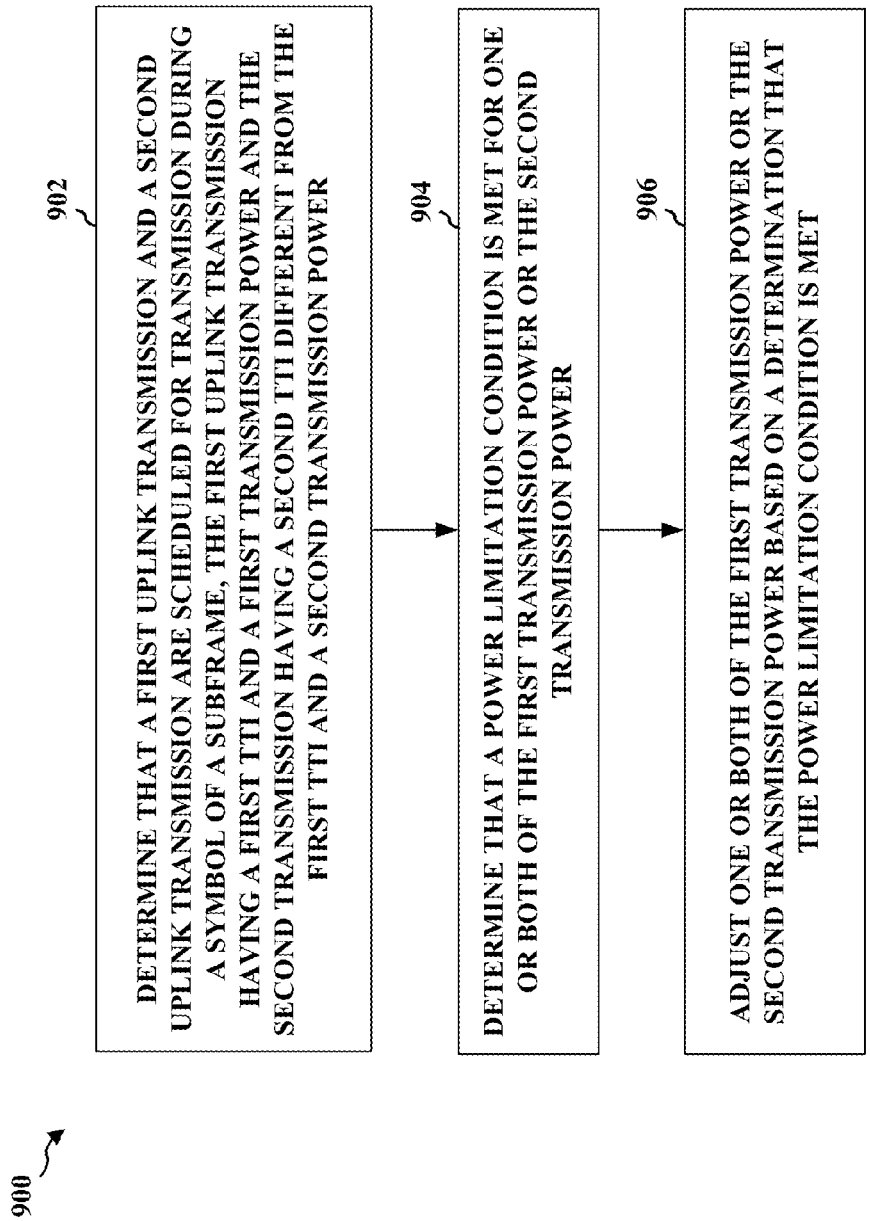
FIG. 9 is a flow chart of a method of transmission power control according to the present disclosure.

FIG. 9 illustrates an example method 900 of the present disclosure, which may be performed by a UE or a component therein (e.g., transmission control component 661 of FIGS. 6 and 8). For example, in an aspect, at block 902, method 900 may include determining that a first uplink transmission and a second uplink transmission are scheduled for transmission during a symbol of a subframe. In an aspect, the first uplink transmission may have a first TTI and a first transmission power and the second uplink transmission may have a second TTI, the second TTI being different from the first TTI, and a second transmission power. Furthermore, block 902 may be performed by uplink transmission schedule determining component 802 of FIG. 8.

In addition, method 900 may include, at block 904, determining that a power limitation condition is met for one or both of the first transmission power or the second transmission power. In an aspect, though not specifically shown in FIG. 9, block 904 may include receiving a configuration of a first maximum power for the first TTI and/or a second maximum power for the second TTI. In an aspect, determining that the power limitation condition is met at block 904 may include comparing the first transmission power and the first maximum power and/or comparing the second transmission power and the second maximum power. Alternatively or additionally, block 904 may include comparing a sum of the first transmission power and the second transmission power with a total transmission power of the symbol. In an aspect, block 904 may be performed by power limitation condition determining component 812 of FIG. 8.

Furthermore, method 900 may include, at block 906, adjusting the first transmission power, the second transmission power, or any combination thereof, based on the determination that the power limitation condition is met at block 904. Though not specifically shown in FIG. 9, block 906 may include receiving a configuration indicating a power control mode and performing transmission power adjustment further based on the received power control mode. In addition, block 906 may include scaling one or both of the first transmission power or the second transmission power such that a sum of the scaled transmission powers does not exceed a total transmission power of the symbol. Moreover, block 906 may include, according to an example power control mode, prioritizing the first transmission power over the second transmission power and adjusting the second transmission power to a guaranteed minimum transmission power. In an aspect, block 906 may be performed by transmission power adjusting component 814 of FIG. 8.

Furthermore, although not explicitly shown in FIG. 9, method 900 may include transmitting (e.g., via transmission component 824 of FIG. 8) the first uplink transmission and the second uplink transmission during the symbol after adjusting the first transmission power, the second transmission power, or any combination thereof.

FIG. 10 is a conceptual data flow diagram 1000 illustrating the data flow between different modules/means/components in an exemplary apparatus 1002. The apparatus 1002 may be a UE, such as UE 115 of FIG. 1, UE 206 of FIG. 2, and/or UE 650 of FIG. 6. The apparatus 1002 includes a receiving module 1004 that is configured to receive downlink data/messages 1010, which may include one or more scheduling messages indicating a resource information and timing information associated with one or more uplink transmissions from apparatus 1002. Such downlink data/messages 1010 may be transmitted to apparatus 1002, for example, by network entity 1008, which may include, but is not limited to, access point 105 of FIG. 1, macro eNB 204 or low power class eNB 208 of FIG. 2, or eNB 610 of FIG. 6.

Once received, and in some examples, decoded or processed, the receiving module 1004 may send the received downlink data/messages 1010, including the scheduling messages 1012 to a transmission control component 661 (see, e.g., FIG. 8). In an aspect, upon receiving each of the one or more scheduling messages 1012 that may be included in the downlink data/messages 1010, the transmission control component 661 may perform any required transmission power control operations for any colliding transmissions indicated in the scheduling messages 1012. After the transmission control component 661 determines the transmission power levels at which one or more uplink transmissions are to be transmitted to network entity 1008, it may generate and send uplink transmissions and related transmission power information 1014 to transmission module 1006. In turn, the transmission module 1006 may be configured to transmit the uplink transmissions 1016 to network entity 1008 at the time and over the resource indicated in the scheduling messages 1012.

The apparatus may include additional modules that perform each of the steps of the method 900 (or an associated algorithm) in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

FIG. 11 is a diagram 1100 illustrating an example of a hardware implementation for an apparatus 1002' employing a processing system 1114. Like apparatus 1002, the apparatus 1002' may be a UE, such as UE 115 of FIG. 1, UE 206 of FIG. 2, and/or UE 650 of FIG. 6, and may be the same apparatus as apparatus 1002 of FIG. 10. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the transmission control component 661 and its related subcomponents (see, e.g., FIG. 8), and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110, which, in some examples, may include transmission component 824 of FIG. 8 and/or receiving module 1004 and/or transmission module 1006 of FIG. 10. The transceiver 1110 is coupled to one or more antennas 1120. The transceiver 1110 provides a means for communicating with various other apparatus (which may include, but are not limited to, access point 105 of FIG. 1, macro eNB 204 or low power class eNB 208 of FIG. 2, eNB 610 of FIG. 6, network entity 1008 of FIG. 10.) The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes transmission control component 661 and its related subcomponents (see, e.g., FIG. 8), which may be configured to perform one or more of the techniques for transmission power control described in the present disclosure. The modules/components may be software modules running in the processor 1104, resident/stored in the computer-readable medium 1106, one or more hardware modules coupled to the processor 1104, or some combination thereof.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of transmission power control, comprising:
   determining, for a particular symbol in a subframe, that a first uplink transmission and a second uplink transmission are scheduled for transmission during the particular symbol, wherein the first uplink transmission is associated with a first transmission time interval (TTI), having a first duration, and a first transmission power, and the second uplink transmission is associated with a second TTI, having a second duration, and a second transmission power, wherein the first duration is different from the second duration;
   determining, based on the determining that the first uplink transmission and the second uplink transmission are scheduled for transmission during the particular symbol of the subframe, that a power limitation condition is met for one or both of the first transmission power or the second transmission power;
   adjusting, based on the determining that the power condition is met, one or both of the first transmission power or the second transmission power; and
   transmitting, based on the adjusting one or both of the first transmission power or the second transmission power, at least one of the first uplink transmission or the second uplink transmission during the particular symbol.

2. The method of claim 1, further comprising receiving a configuration of a first maximum power for the first TTI and a second maximum power for the second TTI.

3. The method of claim 2, wherein the power limitation condition for the first TTI is determined based on a comparison of the first transmission power and the first maximum power, and the first transmission power is adjusted based on the first maximum power when the power limitation condition is met.

4. The method of claim 2, wherein the power limitation condition for the second TTI is determined based on a comparison of the second transmission power and the second maximum power, and the second transmission power is adjusted based on the second maximum power when the power limitation condition is met.

5. The method of claim 1, where the power limitation condition is based on a comparison of a sum of the first transmission power and the second transmission power with a total transmission power of the particular symbol.

6. The method of claim 1, further comprising:
receiving a configuration indicating a power control mode; and,
performing transmission power adjustment further based on the power control mode.

7. The method of claim 1, wherein the adjusting one or both of the first transmission power or the second transmission power comprises scaling one or both of the first transmission power or the second transmission power such that a sum of the first transmission power and the second transmission power does not exceed a total transmission power of the particular symbol.

8. The method of claim 1, further comprising prioritizing the first transmission power over the second transmission power, and wherein adjusting one or both of the first transmission power or the second transmission power comprises adjusting the second transmission power to a guaranteed minimum transmission power.

9. The method of claim 1, further comprising transmitting the first uplink transmission and the second uplink transmission during the particular symbol after adjusting one or both of the first transmission power or the second transmission power.

10. The method of claim 1, wherein the first uplink transmission is an ultra low latency (ULL) uplink transmission and the second uplink transmission is a legacy uplink transmission.

11. The method of claim 1, wherein the second duration corresponds to one subframe and the first duration corresponds to less than one subframe.

12. The method of claim 1, wherein the adjusting is performed further based on a modulation scheme associated with the first uplink transmission.

13. The method of claim 1, wherein the adjusting is performed further based on a modulation scheme associated with the second uplink transmission.

14. The method of claim 1, wherein the adjusting is performed based on a type of channel associated with the first uplink transmission or the second uplink transmission.

15. An apparatus for performing transmission power control, comprising:
means for determining, for a particular symbol of a subframe, that a first uplink transmission and a second uplink transmission are scheduled for transmission during the particular symbol, wherein the first uplink transmission is associated with a first transmission time interval (TTI), having a first duration, and a first transmission power, and the second uplink transmission is associated with a second TTI, having a second duration, and a second transmission power, wherein the first duration is different from the second duration;
means for determining, based on the means for determining that the first uplink transmission and the second uplink transmission are scheduled for transmission during the particular symbol of the subframe, that a power limitation condition is met for one or both of the first transmission power or the second transmission power;
means for adjusting, based on the means for determining that the power limitation condition is met, one or both of the first transmission power or the second transmission power; and
means for transmitting, based on the means for adjusting one or both of the first transmission power or the second transmission power, at least one of the first uplink transmission or the second uplink transmission during the particular symbol.

16. A non-transitory computer-readable medium storing computer-executable code for transmission power control, the code comprising instructions executable to:
determine, for a particular symbol of a subframe, that a first uplink transmission and a second uplink transmission are scheduled for transmission during the symbol, wherein the first uplink transmission is associated with a first transmission time interval (TTI), having a first duration, and a first transmission power, and the second uplink transmission is associated with a second TTI, having a second duration, and a second transmission power, wherein the first duration is different from the second duration;
determine, based on the determining that the first uplink transmission and the second uplink transmission are scheduled for transmission during the particular symbol of the subframe, that a power limitation condition is met for one or both of the first transmission power or the second transmission power;
adjust, based on the determining that the power limitation condition is met, one or both of the first transmission power or the second transmission power; and
transmit, based on the adjusting one or both of the first transmission power or the second transmission power, at least one of the first uplink transmission or the second uplink transmission during the particular symbol.

17. An apparatus for performing transmission power control, comprising:
a processor;
memory in electronic communication with the processor; and
instructions stored in the memory, the instructions being executable by the processor to:
determine, for a particular symbol of a subframe, that a first uplink transmission and a second uplink transmission are scheduled for transmission during the symbol, wherein the first uplink transmission is associated with a first transmission time interval (TTI), having a first duration, and a first transmission power, and the second uplink transmission is associated with a second TTI, having a second duration, and a second transmission power, wherein the first duration is different from the second duration;

determine, based on the determining that the first uplink transmission and the second uplink transmission are scheduled for transmission during the particular symbol of the subframe, that a power limitation condition is met for one or both of the first transmission power or the second transmission power;

adjust, based on the means for determining that the power limitation condition is met, one or both of the first transmission power or the second transmission power; and transmit, based on the adjusting one or both of the first transmission power or the second transmission power, at least one of the first uplink transmission or the second uplink transmission during the particular symbol.

18. The apparatus of claim 17, wherein the instructions are further executable by the processor to receive a configuration of a first maximum power for the first TTI and a second maximum power for the second TTI.

19. The apparatus of claim 18, wherein the power limitation condition for the first TTI is determined, according to the instructions, based on a comparison of the first transmission power and the first maximum power, and the first transmission power is adjusted based on the first maximum power when the power limitation condition is met.

20. The apparatus of claim 18, wherein the power limitation condition for the second TTI is determined, according to the instructions, based on a comparison of the second transmission power and the second maximum power, and the second transmission power is adjusted, according to the instructions, based on the second maximum power when the power limitation condition is met.

21. The apparatus of claim 17, wherein the power limitation condition is based on a comparison of a sum of the first transmission power and the second transmission power with a total transmission power of the particular symbol.

22. The apparatus of claim 17, wherein the instructions are further executable by the processor to:
receive a configuration indicating a power control mode; and
perform transmission power adjustment further based on the power control mode.

23. The apparatus of claim 17, wherein the instructions executable by the processor to adjust one or both of the first transmission power or the second transmission power comprise instructions executable by the processor to scale one or both of the first transmission power or the second transmission power such that a sum of the first transmission power and the second transmission power does not exceed a total transmission power of the particular symbol.

24. The apparatus of claim 17, wherein the instructions executable by the processor further comprise instructions executable by the processor to prioritize the first transmission power over the second transmission power, and wherein the instructions executable by the processor to adjust one or both of the first transmission power or the second transmission power include instructions executable by the processor to adjust the second transmission power to a guaranteed minimum transmission power.

25. The apparatus of claim 17, wherein the instructions further comprise instructions executable by the processor to transmit the first uplink transmission and the second uplink transmission during the particular symbol after adjusting one or both of the first transmission power or the second transmission power.

26. The apparatus of claim 17, wherein the first uplink transmission is an ultra low latency (ULL) uplink transmission and the second uplink transmission is a legacy uplink transmission.

27. The apparatus of claim 17, wherein the second duration corresponds to one subframe and the first duration corresponds to less than one subframe.

28. The apparatus of claim 17, wherein the instructions executable by the processor to adjust one or both of the first transmission power or the second transmission power comprise instructions executable by the processor to adjust one or both of the first transmission power or the second transmission power based on a modulation scheme associated with the first uplink transmission.

29. The apparatus of claim 17, wherein the instructions executable by the processor to adjust one or both of the first transmission power or the second transmission power comprise instructions executable by the processor to adjust one or both of the first transmission power or the second transmission power based on a modulation scheme associated with the second uplink transmission.

30. The method of claim 1, wherein the determining that the first uplink transmission and the second uplink transmission are scheduled for transmission comprises determining, for each symbol in the subframe, the first uplink transmission and the second uplink transmission are scheduled for transmission.

* * * * *